(12) United States Patent
Powell et al.

(10) Patent No.: US 6,657,426 B1
(45) Date of Patent: Dec. 2, 2003

(54) PROGRAMMER

(75) Inventors: Bryan D. Powell, Maple Valley, WA (US); George Leland Anderson, Bothell, WA (US); Lev M. Bolotin, Kirkland, WA (US); Robin Edward Cameron, Snohomish, WA (US)

(73) Assignee: Data I/O Corporation, Redmond, WA (US)

( * ) Notice: Subject to any disclaimer, the term of this patent is extended or adjusted under 35 U.S.C. 154(b) by 0 days.

(21) Appl. No.: 09/471,634

(22) Filed: Dec. 24, 1999

Related U.S. Application Data

(60) Provisional application No. 60/164,794, filed on Nov. 10, 1999.

(51) Int. Cl.⁷ .............................................. G01R 31/02
(52) U.S. Cl. .................................................... 324/158.1
(58) Field of Search ........................... 324/158.1, 73.1, 324/754, 760

(56) References Cited

U.S. PATENT DOCUMENTS

| | | | |
|---|---|---|---|
| 3,539,879 A | * 11/1970 | Bradley et al. | |
| 4,107,784 A | 8/1978 | Van Bemmelen | 364/900 |
| 4,121,284 A | 10/1978 | Hyatt | 364/709 |
| 5,051,920 A | 9/1991 | Reams et al. | 364/509 |
| 5,535,873 A | 7/1996 | Sakamoto et al. | 198/434 |
| 5,828,223 A | * 10/1998 | Rabkin et al. | 324/158.1 |
| 5,994,894 A | * 11/1999 | Fujita | 324/158.1 |
| 6,104,204 A | * 8/2000 | Hayama et al. | 324/158.1 |
| 6,178,526 B1 | * 1/2001 | Nguyen | 714/42 |
| 6,348,789 B1 | * 2/2002 | Terao | 324/158.1 |

FOREIGN PATENT DOCUMENTS

| | | |
|---|---|---|
| EP | 1 018 862 | 7/2000 |
| WO | WO 99 12406 | 3/1999 |

OTHER PUBLICATIONS

BP–6500 In–Line Programming System brochure, BP Microsystems, Inc. 1999, 2 pages.
BP–6500 In–Line Programming System Data Sheet, BP Microsystems, Inc. 1999, 1 page.
"BP–6500 In–Line Programming & Fifth Generation Technology", BP Microsystems, Inc. 1999, 7 pages.

* cited by examiner

Primary Examiner—Neil Abrams
(74) Attorney, Agent, or Firm—Mikio Ishimaru

(57) ABSTRACT

A micro device programming system is provided which permits fast placement of a plurality of unprogrammed micro devices and fast removal of a plurality of programmed micro devices. The system includes a circuit board having electronic components connected to a backplane having a plurality of backplane contacts thereon electrically connected to the circuit board contacts. The flat surface of the backplane is held in a fixed relationship with the flat surface of the circuit board leaving a space for passage of a tape transporting the micro devices under the backplane. A socket adapter has a predetermined plurality of in line sockets capable of holding the plurality of micro devices over the backplane with the plurality of backplane contacts exposed through the sockets.

9 Claims, 2 Drawing Sheets

PROGRAMMER

CROSS-REFERENCE TO RELATED APPLICATION(S)

This application claims the benefit of U.S. Provisional Patent Application 60/164,794, filed on Nov. 10, 1999, which is incorporated herein by reference thereto.

The present application also contains subject matter related to U.S. patent Application Ser. No. 09/419,172, now U.S. Pat. 6,449,523 B1, by Bradley Morris Johnson, Lev M. Bolotin, Simon B. Johnson, Carl W. Olson, Bryan D. Powell, and Janine Whan-Tong entitled "FEEDER/PROGRAMMING/BUFFER OPERATING SYSTEM". The related application is assigned to Data I/O Corporation and is hereby incorporated by reference.

The present application also contains subject matter related to a copending U.S. Patent Application by Bradley Morris Johnson, Lev M. Bolotin, Simon B. Johnson, Carl W. Olson, Bryan D. Powell, and Janine Whan-Tong entitled "FEEDER/PROGRAMMING/BUFFER OPERATING SYSTEM". The related application is assigned to Data I/O Corporation, is identified by Ser. No. 09/419,172, and is hereby incorporated by reference.

The present application further contains subject matter related to concurrently filed U.S. patent application Ser. No. 09/471,667 by Lev M. Bolotin entitled "PROGRAMMER SYSTEMS". The related application is assigned to Data I/O Corporation and is hereby incorporated by reference.

TECHNICAL FIELD

The present invention relates generally to processing systems and more particularly to programmable device programmer systems.

BACKGROUND ART

In the past, certain operations of electronic circuit board assembly were performed away from the main production assembly systems. While various feeder machines and robotic handling systems would populate electronic circuit boards with integrated circuits, the operations related to processing integrated circuits, such as programming, testing, calibration, and measurement were performed in separate areas on separate equipment rather than being integrated into the main production assembly systems.

For example, in the programming of programmable devices such as electrically erasable programmable read-only memories (EEPROMs) and Flash EEPROMs, separate programming equipment was used which was often located in a separate area from the circuit board assembly systems. There were a number of reasons why programming was done off-line.

First, the programming equipment was relatively large and bulky. This was because of the need to accurately insert and remove programmable devices at high speeds into and out of programming sockets in the programmer. Since insertion and removal required relatively long traverses at high speed and very precise positioning, very rigid robotic handling equipment was required. This rigidity requirement meant that the various components had to be relatively massive with strong structural support members to maintain structural integrity and precision positioning of the pick and place system moving at high speeds. Due to the size of the programming equipment and the limited space for the even larger assembly equipment, they were located in different areas.

Second, a single high-speed production assembly system could use up programmed devices faster than they could be programmed on a single programming system. This required a number of programming systems which were generally operated for longer periods of time in order to have a reserve of programmed devices for the production assembly systems. This meant that the operating times and the input requirements were different between the two systems.

Third, no one had been able to build a single system which could be easily integrated with both the mechanical and electronic portions of the production assembly systems. These systems are complex and generally require a great deal of costly engineering time to make changes to incorporate additional equipment.

A major problem associated with programming the programmable devices in a separate area and then bringing the programmed devices into the production assembly area to be inserted into the electronic circuit boards was that it was difficult to have two separate processes running in different areas and to coordinate between the two separate systems. Often, the production assembly system would run out of programmable devices and the entire production assembly system would have to be shut down. At other times, the programming equipment would be used to program a sufficient inventory of programmed devices to assure that the production assembly system would not be shut down; however, this increased inventory costs. Further problems were created when the programming had to be changed and there was a large inventory of programmed integrated circuits on hand. In this situation, the inventory of programmable devices would have to be reprogrammed with an accompanying waste of time and money.

While it was apparent that a better system would be desirable, there appeared to be no way of truly improving the situation. There were a number of apparently insurmountable problems that stood in the way of improvement.

First, the operating speeds of current production assembly systems so greatly exceeded the programming speed capability of conventional programmers that the programmer would have to have a much greater through-put than thought to be possible with conventional systems.

Second, not only must the programmer be faster than existing programmers, it would also have to be much smaller. The ideal system would integrate into a production assembly system, but would do so without disturbing an existing production assembly system or requiring the lengthening of a new production assembly system over that of the length without the ideal system. Further, most of these production assembly systems were already filled with, or designed to be filled with, various types of feeding and handling modules which provide limited room for any additional equipment.

Third, any programmer integrated with the production assembly system would apparently also have to interface with the control software and electronics of the production system software for communication and scheduling purposes. This would be a problem because production assembly system software was not only complex, but also confidential and/or proprietary to the manufacturers of those systems. This meant that the integration must be done with the cooperation of the manufacturers, who were reluctant to spend engineering effort on anything but improving their own systems, or must be done with a lot of engineering effort expended on understanding the manufacturers' software before working on the programmer's control software.

Fourth, the mechanical interface between a programmer and the production equipment needed to be highly accurate for placing programmed devices relative to the pick-and-place handling equipment of the production assembly system.

Fifth, there are a large number of different manufacturers of production handling equipment as well as production manufacturing equipment. This means that the a large number of different production assembly system configurations would have to be studied and major compromises in design required for different manufacturers.

Sixth, the ideal system would allow for changing quickly between different micro devices having different configurations and sizes.

Seventh, the ideal system needed to be able to accommodate a number of different micro device feeding mechanisms including tape, tube, and tray feeders.

Finally, there was a need to be able to quickly reject micro devices which failed during the programming.

All the above problems seemed to render an effective solution impossible. This was especially true when trying to invent a comprehensive system which would be portable, allow "plug and play" operation with only external electric and air power, provide automated programming and handling, and be able to present programmed programmable devices to an automated production assembly system.

DISCLOSURE OF THE INVENTION

The present invention provides a micro device processing system for processing a plurality of unprocessed micro devices into a plurality of processed micro devices. A circuit board has electronic components connected to circuit board contacts provided thereon. A backplane has backplane contacts electrically connected to the circuit board contacts. The flat surface of the backplane is held in a fixed relationship with the flat surface of the circuit board and socket holder having a predetermined plurality of sockets capable of holding the plurality of micro devices, the plurality of sockets in line in parallel to the depth of the backplane and positionable over the backplane with the plurality of backplane contacts exposed through the sockets. The backplane has a space provided underneath so a tape for feeding the plurality of micro devices can pass beneath the backplane.

The present invention provides a micro device programming system for programming a plurality of unprocessed micro devices into a plurality of processed micro devices. A circuit board has electronic components connected to circuit board contacts provided thereon. A backplane has backplane contacts electrically connected to the circuit board contacts. The flat surface of the backplane is held in a fixed relationship with the flat surface of the circuit board and socket holder having a predetermined plurality of sockets capable of holding the plurality of micro devices, the plurality of sockets in line in parallel to the depth of the backplane and positionable over the backplane with the plurality of backplane contacts exposed through the sockets. The backplane has a space provided underneath so a tape for feeding the plurality of micro devices can pass beneath the backplane.

The present invention further provides a processing mechanism capable of processing unprocessed micro devices to produce processed micro devices. A pin driver is positioned in a first orientation and a controller is connected to the pin driver and positioned in the first orientation. A backplane is connected to the pin driver at about 90° to the first orientation and spaced from the controller to have a space provided between the backplane and the controller. A socket adapter is mounted on the backplane and one or more sockets are mounted on the socket adapter for positioning of the unprocessed micro devices.

The present invention further provides a programming system capable of programming unprocessed micro devices to produce processed micro devices. A pin driver is positioned in a first orientation and a backplane adapter has a first end of the backplane adapter connected to the pin driver at about 90° to the first orientation and a second end of the backplane adapter is at about 0° to the first orientation. A socket adapter mounted on the backplane, and one or more sockets are mounted on the socket adapter for insertion of the unprocessed micro devices.

The above and additional advantages of the present invention will become apparent to those skilled in the art from a reading of the following detailed description when taken in conjunction with the accompanying drawings.

BEST MODES FOR CARRYING OUT THE INVENTION

Figures 1, 2:
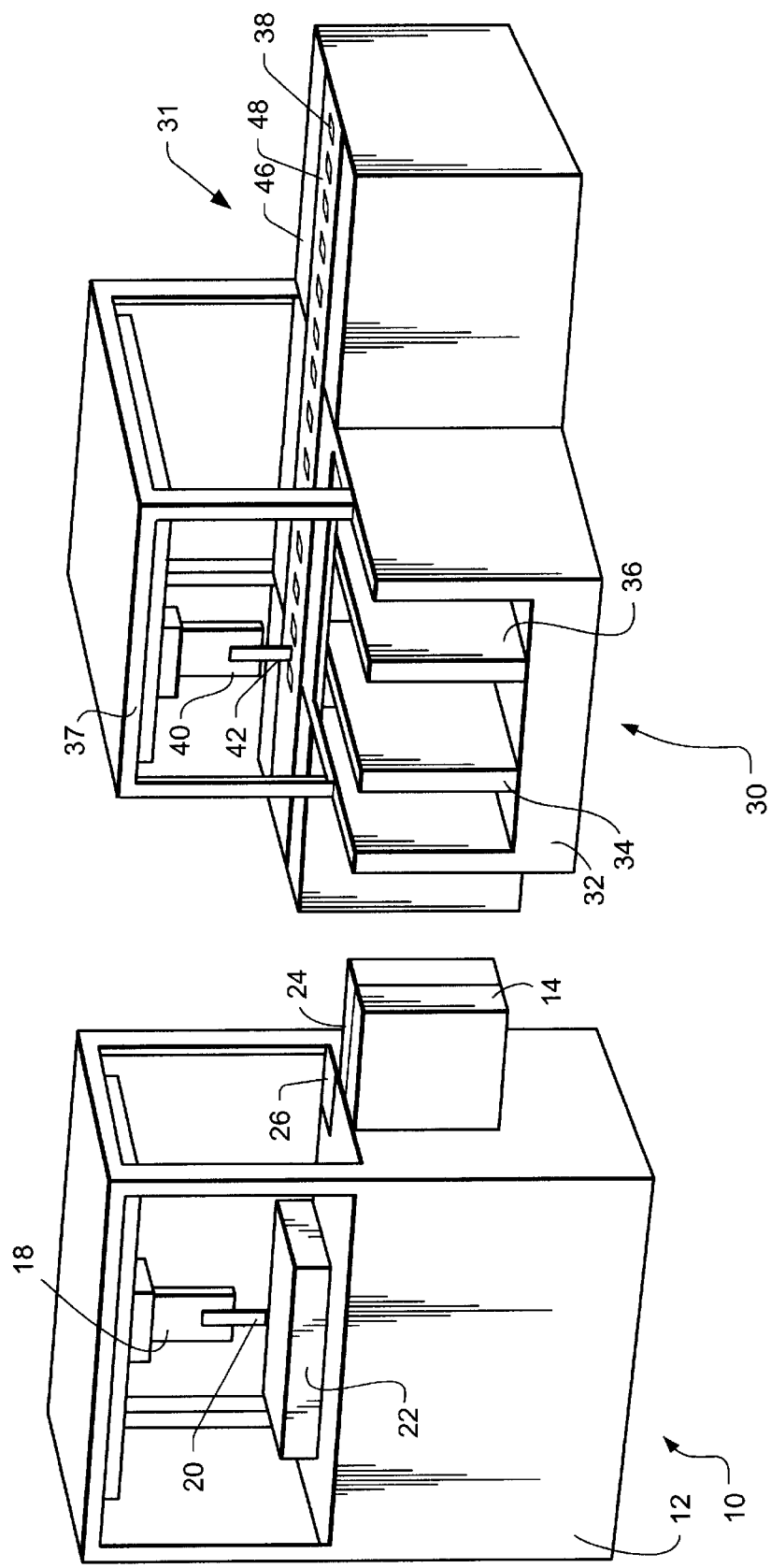
FIG. 1 (PRIOR ART) is an example of a prior art programming system.
FIG. 2 (PRIOR ART) is an example of an electronic circuit board manufacturing line of the prior art which is a part of the present invention.

Referring now to FIG. 1 (PRIOR ART), therein is shown a conventional processing system, such as a programming system 10 for programmable electronic devices. The programming system 10 is relatively large and has a rigid frame 12 to which an input feeder 14 is attached. The input feeder 14 can be a conventional tape and reel, which supplies unprogrammed devices to the programming system 10.

A robotic handling system 18, which is capable of moving in an X-Y-Z and θ coordinate system (with X and Y being horizontal movements, Z being vertical, and θ being angular), carries a pick-and-place (PNP) head 20 for picking up the unprogrammed devices and moving them into a programming area 22 and inserting them into programming sockets (not shown) in the programming system 10.

When the programming is complete, the robotic handling system 18 will move the PNP head 20 into place to remove the parts from the programming sockets and place them into an output mechanism 24. If the programmable devices could not be programmed, the robotic handling system 18 and the PNP head 20 will deposit the failed device into a reject bin 26.

The programming system 10 will continue to operate automatically until all the good devices in the input feeder 14 are programmed and transferred to the output mechanism 24.

Referring now to FIG. 2 (PRIOR ART), therein is shown a production assembly system 30, which includes an assembly system 31. The production assembly system 30 includes a feeder table 32 where various input feeders, such as input feeders 34 and 36, are attached. Where programmed devices are involved, the output mechanism 24 from FIG. 1 (PRIOR ART) would be used as the input feeder 34. In FIG. 2 (PRIOR ART), the two input feeders 34 and 36 are shown installed, where each of the input feeders 34 and 36 could contain the same or different types of programmable devices. The input feeders 34 and 36 can be trays, tray stackers, tubes, tube stackers, or tapes and reels.

The production assembly system 30 has a support frame 37 which carries a robotic handling system 40, which is capable of carrying a PNP head 42 along an X-Y-Z-θ coordinate system to take devices from the input feeders 34 and 36 and place them on subassemblies, such as printed circuit boards 38, as they are moved along a conveyor 48 which is mounted in an assembly system frame 46. The input feeders 34 and 36 are located offset from the direction of movement of the conveyor 48.

The robotic handling system 40 and the conveyor 48 are under the control of a software program running on a computer system (not shown). The software is capable of being modified so as to subject the robotic handling system 40 and the conveyor 48 subject to control by auxiliary equipment or to provide outputs to control auxiliary equipment.

Figures 3, 4:
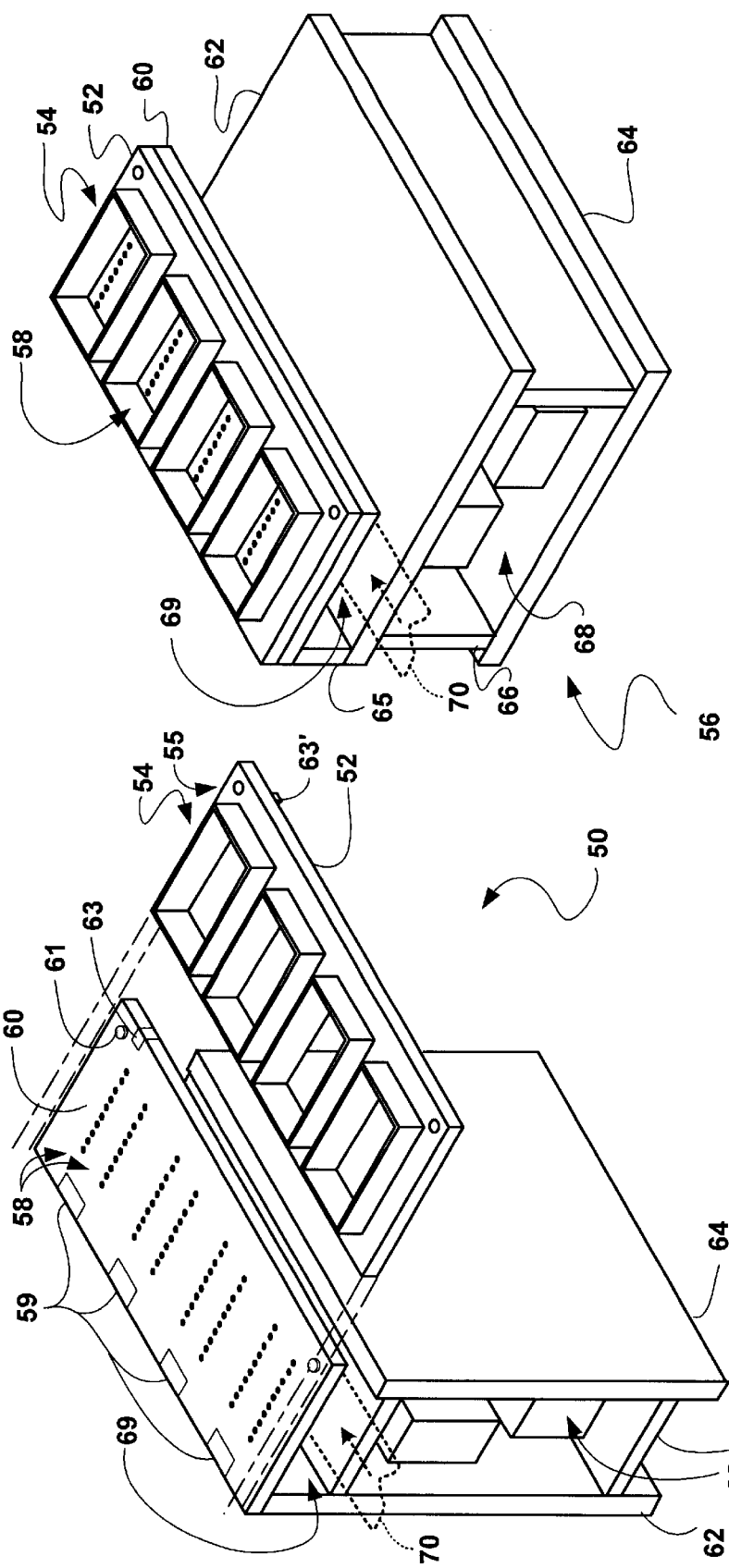
FIG. 3 is an isometric view of the programmer of the present invention.
FIG. 4 is an isometric view an alternate embodiment of the programmer of the present invention.

Referring now to FIG. 3, therein is shown a programmer 50 of the present invention, which may be described as a "vertical", in-line programmer. The programmer 50 consists of a replaceable socket adapter 52 having a plurality of in-line programmable device sockets 54. The socket adapter 52 has a thickness, a width, and a depth, which is larger than the width. The sockets 54 each extends through the thickness, extends across the width, and is in-line and parallel to the depth.

The socket adapter 52 allows for customization of different sizes of programmable devices by virtue of replacement by a socket adapter having different size sockets. Each of the sockets of the plurality of sockets 54 is a conventional socket of the type normally holding a single size programmable device. The number of the sockets in the plurality of sockets 54 is a function of the desired throughput of the programmer 50. In the best mode, there are four sockets 54.

The plurality of sockets 54 are positionable over a horizontally extending backplane 60. The backplane 60 has a thickness, a width, and a depth, which is larger than the width. The size of the backplane 60 is approximately the same size as the socket adapter 52. The width and depth define a flat surface having a plurality of backplane contacts 58 configured to contact various pins on the programmable devices. The socket adapter 52 needs to be in a precise location with respect to the backplane 60, and a number of different mechanisms may be used to provide proper registration. In the preferred embodiment, a pair of through holes 55 (only one indicated) are provided in the socket adapter 52 which fit over a pair of pins 61 (only one indicated) in the backplane 60 (or an external mounting structure where appropriate) which provide registration alignment for the socket adapter 52 over the backplane 60.

The backplane 60 also includes an identifier circuit, of which an identification contact strip 63 is a part, for reading an identifier 63' on the bottom of the socket adapter 52. As previously disclosed, the different socket adapters have different size sockets and the identifier 63' and the contact strip 63 provide for quick identification by the processor which is described below.

The backplane 60 is connected by backplane connectors 59 to a vertically extending pin driver board 62 which provides an interface to a shorter, vertically extending controller card 64. The controller card 64 has a thickness, a width, and a depth where the width and depth define a flat surface. The backplane 60, the pin driver board 62, and the controller card 64 are held in a fixed relationship to each other by such expedients as screws, adhesives, welds, etc. combined with spacers, chassis, etc, such as the spacers 66.

The controller card 64 carries a microprocessor, controller, and/or other circuitry 68 for driving and programming the programmable devices. It should be noted that the horizontally extending backplane 60 is connected to the vertically extending pin driver board 62 which is horizontally connected to the vertically extending controller card 64. Where the width of the controller card 64 is less than the width of the pin driver board 62, a structure is formed with the backplane 60 cantilevered over the pin driver board 62 and the controller card 64 leaving a space 69 just beneath the backplane 60. The backplane 60 has the space 69 provided underneath so a tape for feeding the plurality of micro devices can pass beneath the backplane 60. Where it is desired that a tape 70, such as used for carrying programmable devices, passes as close to the plane of the socket adapter 52 as possible and be laterally removable, this cantilevered structure provides a unique solution. Further, the backplane 60 allows as many sockets 54 as desired to be placed in-line merely by adding to the depth.

Referring now to FIG. 4, therein is shown a programmer 56 of the present invention, which may be described as a horizontal, in-line programmer. Where the elements are the same as described for the programmer 50, shown in FIG. 3, the same numbers and descriptions are applicable.

The plurality of sockets 54 are in line and positionable over the backplane 60. The backplane 60 is connected by a backplane adapter 65 with the backplane connectors 59 to a horizontally extending pin driver board 62 which provides an interface to the horizontally extending controller card 64. It should be noted that for different configurations of the present invention, additional sockets could be added in parallel to the in line plurality of sockets 54 where width wise space permits.

Again, the backplane 60, the pin driver board 62, and the controller card 64 are held in a fixed relationship to each other by such expedients as screws, adhesives, welds, etc. combined with spacers, chassis, etc, such as the spacers 66.

This arrangement permits the programmer 56 to be placed in spaces where the vertical space is restricted or to be used as a stand alone, desktop system.

From the above, it will also be understood that the present invention is applicable to what can be described as "micro devices". Micro devices include a broad range of electronic and mechanical devices. The best mode describes processing which is programming for programmable devices, which include but are not limited to devices such as Flash memories (Flash), electrically erasable programmable read only memories ($E^2$PROM), programmable logic devices (PLDs), field programmable gate arrays (FPGAs), and microcontrollers. However, the present invention encompasses processing for all electronic, mechanical, hybrid, and other devices which require testing, measurement of device characteristics, calibration, and other processing operations. For example, these types of micro devices would include but not be limited to devices such as microprocessors, integrated circuits (ICs), application specific integrated circuits (ASICs), micro mechanical machines, micro-electro-mechanical (MEMs) devices, micro modules, and fluidic systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A processing mechanism capable of processing unprocessed micro devices to produce processed micro devices in a tape, comprising:

a pin driver board positioned in a first orientation;

a controller card connected to the pin driver board and positioned in the first orientation;

a backplane connected to the pin driver board at about 90° to the first orientation and spaced from the controller card to have a space provided between the backplane and the controller card, the backplane cantilevered over the controller card with the space thereunder for passage of the tape;

a socket adapter mounted on the backplane; and one or more sockets mounted on the socket adapter for positioning of the unprocessed micro devices.

2. The processing mechanism as claimed in claim 1 including:

a plurality of alignment pins mounted on the backplane; and a plurality of alignment holes formed on the socket adapter, each of the plurality of alignment pins mates with a corresponding one of the plurality of alignment holes for positioning the socket adapter with respect to the backplane.

3. The processing mechanism as claimed in claim 1 wherein the first orientation is substantially vertical.

4. The processing mechanism as claimed in claim 3 wherein:

the backplane is positioned above the pin driver board; and the controller card is positioned on a side of the pin driver board such that the controller card is directly underneath the backplane.

5. A programming system capable of programming unprocessed micro devices in a tape to produce processed micro devices, comprising:

a pin driver board positioned in a first orientation;

a backplane adapter having a first end and a second end, the first end of the backplane adapter connected to the pin driver board at about 90° to the first orientation;

a backplane connected to the second end of the backplane adapter at about 0° to the first orientation, the backplane cantilevered over the pin driver board with a space thereunder for passage of the tape;

a socket adapter mounted on the backplane; and one or more sockets mounted on the socket adapter for insertion of the unprocessed micro devices.

6. The programming system as claimed in claim 5 including:

a plurality of alignment pins mounted on the backplane; and a plurality of alignment holes formed on the socket adapter, each of the plurality of alignment pins mates with a corresponding one of the plurality of alignment holes for positioning the socket adapter with respect to the backplane.

7. The programming system as claimed in claim 5 including:

a mechanism for detecting and rejecting failed micro devices after programming.

8. The programming system as claimed in claim 5 wherein the first orientation is substantially horizontal.

9. The programming system as claimed in claim 8 wherein: the backplane is positioned above the pin driver board.

* * * * *

UNITED STATES PATENT AND TRADEMARK OFFICE
CERTIFICATE OF CORRECTION

PATENT NO. : 6,657,426 B1 Page 1 of 1
APPLICATION NO. : 09/471634
DATED : December 2, 2003
INVENTOR(S) : Bryan D. Powell et al.

It is certified that error appears in the above-identified patent and that said Letters Patent is hereby corrected as shown below:

Title page, the Title (54), delete "PROGRAMMER" and insert therefor
--PROGRAMMING SYSTEM WITH SOCKETS FOR MICRO DEVICES--

Signed and Sealed this

First Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,657,426 B1 | Page 1 of 1 |
| APPLICATION NO. | : 09/471634 | |
| DATED | : December 2, 2003 | |
| INVENTOR(S) | : Bryan D. Powell et al. | |

It is certified that error appears in the above-identified patent and that said Letters Patent is hereby corrected as shown below:

Title page, the Title (54) and Column 1, line 1, delete "PROGRAMMER" and insert therefor --PROGRAMMING SYSTEM WITH SOCKETS FOR MICRO DEVICES--

This certificate supersedes the Certificate of Correction issued April 1, 2008.

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

PATENT NO.      : 6,657,426 B1
APPLICATION NO. : 09/471634
DATED           : December 2, 2003
INVENTOR(S)     : Powell et al.

It is certified that error appears in the above-identified patent and that said Letters Patent is hereby corrected as shown below:

In column 1, line 8, below "thereto." insert -- The present application contains subject matter related to a copending U.S. Patent Application by Lev M. Bolotin entitled "MANUFACTURING SYSTEM WITH FEEDER/PROGRAMMING/BUFFER SYSTEM". The related application is assigned to Data I/O Corporation, is identified by docket number 1015-001 and serial number 09/418,732, and is hereby incorporated by reference. --.

In column 1, lines 9-16, delete "The present application also contains subject matter related to U.S. patent Application Ser. No. 09/419,172, now U.S. Pat. 6,449,523 B1, by Bradley Morris Johnson, Lev M. Bolotin, Simon B. Johnson, Carl W. Olson, Bryan D. Powell, and Janine Whan-Tong entitled "FEEDER/PROGRAMMING/BUFFER OPERATING SYSTEM". The related application is assigned to Data I/O Corporation and is hereby incorporated by reference.".

Signed and Sealed this

Sixteenth Day of March, 2010

David J. Kappos
*Director of the United States Patent and Trademark Office*